United States Patent
Sone (10) Patent No.: US 10,821,692 B2
(45) Date of Patent: Nov. 3, 2020

(54) TIRE

(71) Applicant: BRIDGESTONE CORPORATION, Chuo-ku, Tokyo (JP)

(72) Inventor: Naoyuki Sone, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 388 days.

(21) Appl. No.: 15/765,721

(22) PCT Filed: Sep. 20, 2016

(86) PCT No.: PCT/JP2016/077707
§ 371 (c)(1),
(2) Date: Apr. 4, 2018

(87) PCT Pub. No.: WO2017/061268
PCT Pub. Date: Apr. 13, 2017

(65) Prior Publication Data
US 2018/0281329 A1    Oct. 4, 2018

(30) Foreign Application Priority Data

Oct. 5, 2015  (JP) .................................. 2015-197638

(51) Int. Cl.
| | | |
|---|---|---|
| B29D 30/32 | (2006.01) | |
| B60C 1/00 | (2006.01) | |
| B60C 5/01 | (2006.01) | |
| C08L 23/04 | (2006.01) | |
| C08L 23/16 | (2006.01) | |
| C08L 53/00 | (2006.01) | |
| B29D 30/06 | (2006.01) | |
| C08F 255/06 | (2006.01) | |
| C08F 279/02 | (2006.01) | |
| C08L 75/04 | (2006.01) | |

(52) U.S. Cl.
CPC ......... *B29D 30/32* (2013.01); *B29D 30/0661* (2013.01); *B29D 30/0678* (2013.01); *B60C 1/00* (2013.01); *B60C 5/01* (2013.01); *C08F 255/06* (2013.01); *C08F 279/02* (2013.01); *C08L 23/04* (2013.01); *C08L 23/16* (2013.01); *C08L 53/00* (2013.01); *B29D 2030/0621* (2013.01); *B29D 2030/3207* (2013.01); *C08L 75/04* (2013.01)

(58) Field of Classification Search
CPC .......... C08L 23/04; C08L 23/16; C08L 53/00; C08L 75/04; C08F 255/06; C08F 279/02; B60C 5/01; B60C 1/00; B29D 30/0678; B29D 30/32; B29D 30/0661; B29D 2030/3207; B29D 2030/0621
See application file for complete search history.

(56) References Cited

U.S. PATENT DOCUMENTS

| | | |
|---|---|---|
| 2008/0315159 A1 | 12/2008 | Minagoshi |
| 2011/0297283 A1 | 12/2011 | Kouno et al. |
| 2012/0225990 A1 | 9/2012 | Jacob |
| 2013/0206311 A1 | 8/2013 | Fudemoto et al. |
| 2014/0299249 A1 | 10/2014 | Custodero et al. |
| 2015/0018495 A1 | 1/2015 | Fukushima et al. |
| 2015/0101728 A1 | 4/2015 | Fudemoto et al. |
| 2016/0347121 A1 | 12/2016 | Greiveldinger et al. |

FOREIGN PATENT DOCUMENTS

| | | |
|---|---|---|
| CN | 101103073 A | 1/2008 |
| CN | 102317089 A | 1/2012 |
| CN | 103201121 A | 7/2013 |
| CN | 103987776 A | 8/2014 |
| EP | 2123480 A2 | 11/2009 |
| FR | 3016829 A1 | 7/2015 |
| JP | H08-231773 A | 9/1996 |
| JP | 2003-183623 A | 7/2003 |
| JP | 2005-133036 A | 5/2005 |
| JP | 2008-308516 A | 12/2008 |
| JP | 2014-511419 A | 4/2011 |
| JP | 2012-046031 A | 3/2012 |

OTHER PUBLICATIONS

Extended European Search Report dated Jul. 19, 2018 issued in corresponding EP Patent Application No. 16853422.0.
International Search Report issued in International Application No. PCT/JP2016/077707 dated Dec. 6, 2016.
Search Report of the Chinese office action dated Jun. 12, 2019, from the SIPO in a Chinese patent application corresponding to the instant patent application.

*Primary Examiner* — Angela C Scott
(74) *Attorney, Agent, or Firm* — Solaris Intellectual Property Group, PLLC (57) ABSTRACT

A tire is provided, which includes: a circular tire frame formed from a resin material containing an olefin resin; and an exterior member formed from a thermoplastic rubber vulcanizate which contains an ethylene-propylene-diene rubber and a polyethylene-based resin, and in which a content of the ethylene-propylene-diene rubber is from 20% by mass to 45% by mass with respect to a total mass of the thermoplastic rubber vulcanizate, and a fluidity is from 1.0 g/10 min to 60 g/10 min.

6 Claims, 4 Drawing Sheets

TIRE

This application is a National Stage application of International Application No. PCT/JP2016/077707, filed on Sep. 20, 2016, which claims priority to Japanese Patent Application No. 2015-197638, filed on Oct. 5, 2015. Each of the above applications is hereby expressly incorporated by reference, in its entirety, into the present application.

TECHNICAL FIELD

The present invention relates to a tire to be mounted on a rim, particularly a tire which has a tire frame and an exterior member.

BACKGROUND ART

Conventionally, pneumatic tires composed of rubber, organic fiber materials, steel members and the like have been used in vehicles such as passenger cars.

In recent years, the use of resin materials, particularly thermoplastic resins, thermoplastic elastomers and the like, as tire materials has been examined from the standpoints of weight reduction, ease of molding, and recyclability.

For example, tires in which a polyolefin-based thermoplastic elastomer is used as a resin material constituting the tire frame have been proposed (see, for example, Japanese Patent Application Laid-Open (JP-A) No. 2012-046031).

SUMMARY OF INVENTION

Technical Problem

Tires using a resin material can be produced more easily and at a lower cost than conventional tires made of rubber. Accordingly, attempts have been made to apply a resin material also to members other than the tire frame, such as an exterior member. However, although the use of a resin material, particularly a polyethylene-based resin, as, for example, an exterior material is advantageous from the cost standpoint, it tends to be difficult to obtain an exterior member that can be injection-molded and satisfies all of the desired or demanded hardness, permanent compression set and wear resistance at the same time.

In view of the above-described circumstances, an object of one embodiment of the invention is to provide a tire which includes: a tire frame formed from a resin material containing an olefin resin; and an exterior member which has a high hardness, a small permanent compression set and excellent wear resistance and can be injection-molded.

Solution to Problem

Concrete means for solving the above-described problem includes the following mode.

A tire including: a circular tire frame formed from a resin material containing an olefin resin; and an exterior member formed from a thermoplastic rubber vulcanizate which contains an ethylene-propylene-diene rubber and a polyethylene-based resin, and in which a content of the ethylene-propylene-diene rubber is from 20% by mass to 45% by mass with respect to a total mass of the thermoplastic rubber vulcanizate, and a fluidity is from 1.0 g/10 min to 60 g/10 min.

Effects of Invention

According to one embodiment of the invention, a tire which includes: a tire frame formed from a resin material containing an olefin resin; and an exterior member which has a high hardness, a small permanent compression set and excellent wear resistance and can be injection-molded is provided.

DESCRIPTION OF EMBODIMENTS

Mode for Carrying Out the Invention

Specific embodiments of the invention are described below in detail; however, the invention is not restricted to the following embodiments by any means, and the invention can be carried out with modifications as appropriate within the intended scope of the invention.

The term "resin" used herein is a concept that encompasses thermoplastic resins and thermosetting resins, but not vulcanized rubbers. The concept of "thermoplastic resin" encompasses thermoplastic elastomers.

The term "rubber" refers to an elastic polymer compound and, in the present specification, a rubber is distinguished from a thermoplastic resin elastomer.

Further, the term "thermoplastic resin elastomer" refers to a thermoplastic resin material which is an elastic polymer compound and composed of a copolymer that includes a polymer constituting a crystalline high-melting-point hard segment or a hard segment having a high cohesive strength, and a polymer constituting an amorphous low-glass-transition-temperature soft segment.

In the present specification, those numerical ranges that are stated with "to" each denote a range that includes the numerical values stated before and after "to" as the lower and upper limit values, respectively.

Moreover, the term "step" encompasses not only discrete steps but also steps which cannot be clearly distinguished from other steps, as long as the intended purpose of the step is achieved.

In the drawings of the disclosure, constituents indicated with the same symbol mean identical constituents.

<<Tire>>

The tire according to one embodiment of the invention includes: a circular tire frame formed from a resin material containing an olefin resin; and an exterior member formed from a thermoplastic rubber vulcanizate (hereinafter, also referred to as "specific TPV") which contains an ethylene-propylene-diene rubber (hereinafter, also referred to as "EPDM") and a polyethylene-based resin and in which the content of the ethylene-propylene-diene rubber is from 20% by mass to 45% by mass with respect to the total mass of the thermoplastic rubber vulcanizate and the fluidity is from 1.0 g/10 min to 60 g/10 min.

In the tire according to one embodiment of the invention which is a tire having a circular tire frame formed from a resin material containing an olefin resin, an exterior member which has a high hardness, a small permanent compression set and excellent wear resistance can be formed by injection molding using a specific TPV as the material constituting the exterior member.

That is, by incorporating an EPDM in a specific amount and a polyethylene-based resin into the specific TPV, it is believed that the hardness, the permanent compression set and the wear resistance are all satisfied at high levels while injection properties are maintained.

Furthermore, it is believed that incorporation of the polyethylene-based resin into the thermoplastic rubber vulcanizate enables to (thermally) weld the exterior member to the circular tire frame formed from the resin material containing the olefin resin or to integrally mold the tire frame and the exterior member, and that this leads to excellent adhesion between the tire frame and the exterior member. Therefore, the tire according to one embodiment of the invention is believed to have excellent durability.

<Tire Frame>

The tire according to one embodiment of the invention includes a circular tire frame formed from a resin material containing an olefin resin.

By using a resin material containing an olefin resin as the tire frame, a tire with a higher production efficiency and a lower cost can be realized as compared to conventional tires made of rubber can be realized while achieving performance comparable to conventional rubber-made tires.

[Resin Material]

The tire according to one embodiment of the invention includes a circular tire frame formed from a resin material containing at least one olefin resin.

It is preferred that the resin material contains the olefin resin in an amount of greater than 50% by mass (more preferably not less than 70% by mass, still more preferably from 70% by mass to 100% by mass) with respect to the total mass of the resin material. The resin material may also contain a resin other than the olefin resin, and other optional component(s) (additives).

(Olefin Resin)

The olefin resin is a resin which is mainly constituted by at least a crystalline polyolefin. Examples thereof include polyolefin-based thermoplastic elastomers (TPO) defined in JIS K6418:2007, polyethylenes, polypropylenes, isotactic polypropylenes, and polybutenes.

Examples of the olefin resin include olefin-α-olefin copolymers and olefin copolymers, specifically the following polymers.

polyethylene
ethylene-propylene copolymer
ethylene-hexene copolymer
ethylene-pentene copolymer
ethylene-octene copolymer
propylene-1-hexene copolymer
ethylene-4-methyl-pentene copolymer
propylene-4-methyl-1-pentene copolymer
ethylene-butene copolymer
propylene-butene copolymer
1-butene-hexene copolymer
1-butene-4-methyl-pentene copolymer
ethylene-methacrylic acid copolymer
ethylene-methyl methacrylate copolymer
ethylene-ethyl methacrylate copolymer
ethylene-butyl methacrylate copolymer
ethylene-methyl acrylate copolymer
ethylene-ethyl acrylate copolymer
ethylene-butyl acrylate copolymer
ethylene-vinyl acetate copolymer
propylene-methacrylic acid copolymer
propylene-methyl methacrylate copolymer
propylene-ethyl methacrylate copolymer
propylene-butyl methacrylate copolymer
propylene-methyl acrylate copolymer
propylene-ethyl acrylate copolymer
propylene-butyl acrylate copolymer
propylene-vinyl acetate copolymer The olefin resin is more preferably a polyethylene-based resin, such as a polyethylene, an ethylene-propylene copolymer, an ethylene-butene copolymer, an ethylene-pentene copolymer, an ethylene-hexene copolymer, or an ethylene-octene copolymer. By using a polyethylene-based resin, a tire frame having superior impact resistance can be obtained.

The details of the polyethylene-based resin are the same as those of the polyethylene-based resin described below for the thermoplastic rubber vulcanizate constituting the exterior member.

The olefin resin can be synthesized by copolymerization in accordance with a known method.

As the olefin resin, for example, a commercially available product, such as "TAFMER (registered trademark)" Series manufactured by Mitsui Chemicals, Inc., "ADMER (registered trademark)" Series manufactured by Mitsui Chemicals, Inc., "NUCREL" Series manufactured by Du Pont-Mitsui Polychemicals Co., Ltd., "ELVALOY AC" Series manufactured by Du Pont-Mitsui Polychemicals Co., Ltd., "ACRYFT (registered trademark)" Series manufactured by Sumitomo Chemical Co., Ltd., "EVATATE" Series manufactured by Sumitomo Chemical Co., Ltd., "ULTRATHENE (registered trademark)" Series manufactured by Tosoh Corporation, "PRIME TPO (registered trademark)" Series manufactured by Prime Polymer Co., Ltd., "PRIME POLYPRO" Series manufactured by Prime Polymer Co., Ltd., "UMERIT (registered trademark)" Series manufactured by Ube-Maruzen Polyethylene Co., Ltd., "NOVATEC (registered trademark)" Series manufactured by Japan Polyethylene Corporation, or "NOVATEC (registered trademark)" Series manufactured by Japan Polypropylene Corporation can be used.

<<Acid Modification of Olefin Resin>>

As the olefin resin contained in the resin material, an acidic group-containing olefin resin (i.e., an acid-modified olefin resin) can be used as well.

By incorporating an acid-modified olefin resin into the resin material, when a reinforcing cord is directly wound on the outer circumferential portion of the tire frame or when a reinforcing cord-containing reinforcing cord layer is formed and embedded in the outer circumferential portion of the tire frame, the adhesion between the tire frame and the reinforcing cord can be improved.

From the standpoint of inhibiting deterioration of the resin material, the acidic group contained in the acid-modified olefin resin is, for example, a weak acid group such as a carboxylic acid group, a sulfuric acid group, or a phosphoric acid group, and the acidic group is particularly preferably a carboxylic acid group.

The term "acid-modified" used herein means that an unsaturated compound having an acidic group (e.g., a carboxylic acid group, a sulfuric acid group, or a phosphoric acid group) is bound to an olefin resin. For example, when an unsaturated carboxylic acid (generally, maleic anhydride) is used as the unsaturated compound having an acidic group, an unsaturated binding site of the unsaturated carboxylic acid is bound (e.g., graft-polymerized) to an olefin resin.

Usually, acid modification of an olefin resin can be performed by kneading and graft-copolymerizing the olefin resin with an unsaturated compound having an acidic group (e.g., unsaturated carboxylic acid) and an organic peroxide using a biaxial extruder or the like. The unsaturated compound having an acidic group is added in an amount of preferably from 0.01 parts by mass to 20 parts by mass, more preferably from 0.01 parts by mass to 10 parts by mass, with respect to 100 parts by mass of the olefin resin.

When the unsaturated compound having an acidic group is added in an amount of 0.01 parts by mass or greater, the amount thereof grafted to the olefin resin is increased. Meanwhile, when the unsaturated compound having an acidic group is added in an amount of 20 parts by mass or less, since the amount of unreacted unsaturated carboxylic acid in the resulting resin is reduced, a sufficient adhesive strength is obtained, and the processability is thus improved.

The amount of the organic peroxide to be added may be any amount as long as it is sufficient for performing a graft reaction, and it is, for example, preferably from 0.01 parts by mass to 5 parts by mass, more preferably from 0.03 parts by mass to 1 part by mass.

Examples of the organic peroxide include 1,1-bis(t-butylperoxy)cyclohexane, 2,2-bis(4,4-di-t-butylperoxycyclohexyl)propane, 1,1-bis(t-butylperoxy)cyclododecane, t-hexylperoxyisopropyl monocarbonate, t-butylperoxy-3,5,5-trimethyl hexanoate, t-butylperoxylaurate, 2,5-dimethyl-2,5-di(benzoylperoxy)hexane, t-butylperoxyacetate, 2,2-bis(t-butylperoxy)butene, t-butylperoxybenzoate, n-butyl-4,4-bis(t-peroxy)valerate, di-t-butylperoxy isophthalate, dicumyl peroxide, α-α'-bis(t-butylperoxy-m-isopropyl)benzene, 2,5-dimethyl-2,5-di(t-butylperoxy)hexane, 1,3-bis(t-butylperoxydiisopropyl)benzene, t-butylcumyl peroxide, di-t-butyl peroxide, p-menthane hydroperoxide, 2,5-dimethyl-2,5-di(t-butylperoxy)hexine-3, di-3-methoxybutylperoxy dicarbonate, di-2-ethylhexylperoxy dicarbonate, bis(4-t-butylcyclohexyl)peroxy dicarbonate, diisopropylperoxy dicarbonate, t-butylperoxyisopropyl carbonate, dimyristyl peroxycarbonate, 1,1,3,3-tetramethylbutyl neodecanoate, α-cumyl peroxyneodecanoate, and t-butyl peroxyneodecanoate.

These organic peroxides may be used singly, or in combination of two or more thereof.

Examples of the acid-modified olefin resin include olefin resins that are graft-polymerized with acrylic acid, methacrylic acid, itaconic acid, crotonic acid, isocrotonic acid, maleic acid, or the like.

The weight-average molecular weight of the olefin resin is preferably from 50,000 to 3,000,000, more preferably from 50,000 to 2,500,000, still more preferably from 50,000 to 2,000,000. When the weight-average molecular weight of the olefin resin is in this range, the resin material has sufficient mechanical and physical properties and excellent processability.

The weight-average molecular weight can be measured by gel permeation chromatography (GPC) using, for example, a GPC (gel permeation chromatography) apparatus such as "HLC-8321GPC/HT" manufactured by Tosoh Corporation.

(Other Resin)

In one embodiment of the invention, the resin material contains at least an olefin resin (preferably in an amount of 50% by mass or greater) and may also contain a resin other than the olefin resin, or an amorphous olefin resin, as remainder. Such other resin is preferably a thermoplastic resin or a thermoplastic elastomer, and examples thereof include polyamide resins, polyurethane resins, polyester resins, fluorocarbon resins, polyamide thermoplastic elastomers, polyester thermoplastic elastomers, polyurethane thermoplastic elastomers, and styrene thermoplastic elastomers.

(Additives)

In the resin material, a variety of additives may also be incorporated as desired. Examples of the additives include rubbers (e.g., hydrogenated styrene-butadiene rubbers (HSBR), styrene-butadiene rubbers, ethylene-propylene rubbers, isoprene rubbers, natural rubbers, chloroprene rubbers, acrylic rubbers, chlorinated polyethylenes, and fluorocarbon rubbers), various fillers (e.g., silica, calcium carbonate, and clay), age resistors, oils, plasticizers, colorants, weather resistant agents, and reinforcing agents.

The content of the additives in the resin material is not particularly restricted, and the additives can be used as appropriate within a range that does not impair the effects of the invention.

—Physical Properties of Resin Material—

The tensile elastic modulus (hereinafter, unless otherwise specified, the term "elastic modulus" used herein means tensile elastic modulus), which is defined in JIS K7113:1995, of the resin material itself containing the olefin resin is preferably from 100 MPa to 1,000 MPa, more preferably from 100 MPa to 800 MPa, particularly preferably from 100 MPa to 700 MPa. When the tensile elastic modulus of the resin material is from 100 MPa to 1,000 MPa, the tire can be efficiently mounted on a rim while maintaining the shape of the tire frame.

The tensile strength at yield, which is defined in JIS K7113:1995, of the resin material itself containing the olefin resin is preferably not less than 5 MPa, more preferably from 5 MPa to 20 MPa, still more preferably from 5 MPa to 17 MPa. When the tensile strength at yield of the resin material is 5 MPa or greater, the tire is capable of enduring deformation caused by a load applied to the tire during running or the like.

The tensile elongation at yield, which is defined in JIS K7113:1995, of the resin material itself containing the olefin resin is preferably not less than 10%, more preferably from 10% to 70%, still more preferably from 15% to 60%. When the tensile elongation at yield of the resin material is 10% or greater, a large elastic region is provided, so that the rim fittability can be improved.

The tensile elongation at break, which is defined in JIS K7113:1995, of the resin material itself containing the olefin resin is preferably not less than 50%, more preferably not less than 100%, still more preferably not less than 150%, particularly preferably not less than 200%. When the tensile elongation at break of the resin material is 50% or greater, favorable rim fittability can be attained, and the tire can be made unlikely to rupture at collision.

The deflection temperature under load (under a load of 0.45 MPa), which is defined in ISO75-2 or ASTM D648, of the resin material itself containing the olefin resin is preferably 50° C. or higher, more preferably from 50° C. to 150° C., still more preferably from 50° C. to 130° C. With the deflection temperature under load of the resin material being 50° C. or higher, deformation of the tire frame can be inhibited even when vulcanization is performed in the production of the tire.

<Exterior Member>

The tire according to one embodiment of the invention has an exterior member along with a tire frame.

The term "exterior member" used herein means a member that is arranged on the outer side of the tire frame and covers at least a portion of the outer surface of the tire frame.

The exterior member may be arranged in direct contact with the tire frame surface, or may be arranged on an intermediate layer or the like that is formed on the tire frame surface. In the tire according to one embodiment of the invention, it is preferred that the exterior member is at least partially in direct contact with the tire frame. Examples of the exterior member include a tread member arranged on the crown portion of the tire frame, a side member arranged on the side portions of the tire frame, and a chaffer member arranged on the bead portions of the tire frame. It is noted here that the exterior member of the invention is not necessarily the outermost layer of the tire of the invention and, for example, a decorative layer or a protective layer may be arranged on the outer surface of the exterior member.

The exterior member contains an ethylene-propylene-diene rubber (EPDM) and a polyethylene-based resin and is formed from a thermoplastic rubber vulcanizate (specific TPV) in which the content of the EPDM is from 20% by mass to 45% by mass with respect to the total mass of the thermoplastic rubber vulcanizate and whose fluidity is from 1.0 g/10 min to 60 g/10 min.

Since the specific TPV contains an EPDM in a specific amount and a polyethylene-based resin, the hardness, the permanent compression set and the wear resistance are all satisfied at high levels while maintaining the injection properties.

(Thermoplastic Rubber Vulcanizate)

The thermoplastic rubber vulcanizate (TPV) is a mixture of a thermoplastic resin (resin component) and a rubber (rubber component) as defined in JIS K6418:2007, and the rubber used in the specific TPV is cross-linked (dynamically cross-linked) by dynamic vulcanization.

The specific TPV contains an ethylene-propylene-diene rubber (EPDM) that is dynamically cross-linked in the below-described manner as a rubber component, and a polyethylene-based resin as a thermoplastic resin.

The term "dynamically cross-linked" used herein means that the rubber is cross-linked by a cross-linking agent under high shear conditions. The dynamic cross-linking is performed by mixing the rubber and the cross-linking agent at the cross-linking temperature of the rubber or a higher temperature in a mixing apparatus such as a roll mill, a BANBURY (registered trademark) mixer, a continuous mixer, a kneader, or a mixing extruder (e.g., a biaxial extruder). In this manner, by dynamically cross-linking the rubber, the permanent compression set of the TPV can be reduced. The dynamic cross-linking is described in more detail below.

The specific TPV has a fluidity of from 1.0 g/10 min to 60 g/10 min. From the standpoint of the injection properties, the fluidity of the specific TPV is preferably from 1.5 g/10 min to 20 g/10 min, more preferably from 2.5 g/10 min to 15 g/10 min.

The fluidity of the specific TPV can be determined by measuring the melt flow rate (MFR) in accordance with ASTM A1238 (Method B) under a load of 98.07 N at a temperature of 230° C.

From the standpoint of allowing the EPDM to exert its effect, the content of the EPDM in the specific TPV is from 20% by mass to 45% by mass with respect to the total mass of the specific TPV. From the standpoint of the balance between the hardness and the permanent compression set of the exterior member, the content of the EPDM is preferably from 25% by mass to 40% by mass, more preferably from 30% by mass to 35% by mass.

It is preferred that the polyethylene-based resin and the EPDM that are contained in the specific TPV have a so-called sea-island structure in which the EPDM forming a non-continuous phase is dispersed as a dispersed phase (i.e., domain) in the matrix of the polyethylene-based resin forming a continuous phase. By adopting such a dispersed structure, the specific TPV is allowed to have a small permanent compression set while maintaining a high hardness.

The state where an island phase containing the EPDM is dispersed in a sea phase containing the polyethylene-based resin can be confirmed by observing a photograph taken under an SEM (scanning electron microscope).

The size (major axis) of the island phase containing the EPDM is preferably from 0.4 µm to about 10.0 µm, more preferably from 0.5 µm to about 7 µm, particularly preferably from 0.5 µm to about 5 µm. The size of each phase can be measured by observing a photograph taken under an SEM.

Examples of a method of preparing the specific TPV include a method of kneading the polyethylene-based resin and the EPDM using a known technique. As a kneading machine for the kneading, for example, a screw extruder, a kneader, a BANBURY mixer, or a biaxial kneading extruder can be employed.

(Polyethylene-Based Resin)

The specific TPV contains at least one polyethylene-based resin.

By incorporating a polyethylene-based resin and the below-described ethylene-propylene-diene rubber (EPDM) into the specific TPV and controlling the content of the EPDM in the specific TPV to be in a specific range, the hardness, the permanent compression set and the wear resistance can all be satisfied at high levels. Further, the incorporation of a polyethylene-based resin into the specific TPV enables to (thermally) weld the exterior member to the tire frame or to integrally mold the tire frame and the exterior member, so that a tire having excellent adhesion between the tire frame and the exterior member can be obtained.

Examples of the polyethylene-based resin include ethylene homopolymers, ethylene-α-olefin copolymers, and ethylene copolymers.

More specific examples thereof include high-density polyethylenes (HDPEs), medium-density polyethylenes (MDPEs), low-density polyethylenes (LDPEs), linear low-density polyethylenes (LLDPEs), and olefin-block copolymers (OBCs) such as ethylene-1-octene copolymers.

It is noted here that an HDPE, an MDPE, an LDPE and an LLDPE are distinguished from each other based on the density. The density of an HDPE is 0.942 g/m$^3$ or greater; the density of an MDPE is from 0.930 g/m$^3$ to less than 0.942 g/m$^3$; and an LDPE and an LLDPE have a density of from 0.910 g/m$^3$ to less than 0.930 g/m$^3$.

Among polyethylene-based resins, an LLDPE is preferred from the standpoint of the injection properties of the thermoplastic rubber vulcanizate. It is noted here that the term "LLDPE" used herein refers to a copolymer of ethylene and an α-olefin having from 3 to 20 carbon atoms, and an LLDPE is distinguished from an LDPE in that the former does not have a long branch of more than 20 carbon atoms.

Further, among polyethylene-based resins, an LLDPE is preferred also from the standpoint of suitably maintaining the permanent compression set, the fluidity, the injection moldability and the wear resistance of the thermoplastic rubber vulcanizate and, particularly, imparting the thermoplastic rubber vulcanizate with excellent hardness.

Moreover, among polyethylene-based resins, an olefin block copolymer (OBC) is preferred from the standpoint of suitably maintaining the hardness, the fluidity, the injection moldability and the wear resistance of the thermoplastic rubber vulcanizate and, particularly, enabling to largely improve the permanent compression set of the thermoplastic rubber vulcanizate.

From the standpoint of the injection properties of the thermoplastic rubber vulcanizate, the α-olefin is preferably an α-olefin having from 4 to 12 carbon atoms. Specific examples of the α-olefin include propylene, 1-butene, 1-pentene, 4-methyl-1-pentene, 1-hexene, 1-octene, 1-nonene, 1-decene, and 1-dodecene.

As the LLDPE, one which is produced by a conventionally known general production method using a conventionally known general catalyst can be used.

Examples of the conventionally known catalyst include Ziegler catalysts, metallocene catalysts, and vanadium catalysts. Thereamong, from the standpoint of easily adjusting the crystallization degree of the LLDPE in a prescribed range, metallocene catalysts and Ziegler catalysts are preferred, and metallocene catalysts are more preferred.

Examples of the conventionally known production method include vapor-phase polymerization, solution polymerization, slurry polymerization, and high-pressure ionic polymerization. Thereamong, from the standpoint of easily adjusting the crystallization degree of the LLDPE in a prescribed range, vapor-phase polymerization and solution polymerization are preferred, and vapor-phase polymerization is more preferred.

Examples of the LLDPE include commercially available products, such as UMERIT 613A, 1540F, 2525F and 2540F, which are manufactured by Ube-Maruzen Polyethylene Co., Ltd.; NOVATEC LL UF230 manufactured by Japan Polyethylene Corporation; and ULTZEX 2022L, NEOZEX 2511F, and EVOLUE SP1540, which are manufactured by Prime Polymer Co., Ltd.

Examples of the OBC include ethylene-1-propylene copolymers, ethylene-1-butene copolymers, ethylene-1-hexene copolymers, and ethylene-1-octene copolymers. It is noted here that an OBC is distinguished from an LLDPE in that the former does not have any side chain therein.

Examples of the OBC also include commercially available products, such as INFUSE 9817 manufactured by The Dow Chemical Company.

—Physical Properties of Polyethylene-Based Resin—

From the standpoint of the injection properties of the thermoplastic rubber vulcanizate, the crystallization degree of the polyethylene-based resin is preferably from 75 J/g to 140 J/g.

Particularly, when an LLDPE is used as the polyethylene-based resin, the crystallization degree of the LLDPE is preferably from 85 J/g to 138 J/g, more preferably from 90 J/g to 125 J/g, still more preferably from 100 J/g to 115 J/g, most preferably from 100 J/g to 110 J/g. By controlling the crystallization degree in this range, the injection moldability and the wear resistance can both be satisfied at high levels.

The crystallization degree of the polyethylene-based resin can be adjusted based on, for example, the molecular weight of the whole polyethylene-based resin, the length of a side chain, and/or the number of side chains per 1,000 carbon atoms of the main chain.

The term "crystallization degree" used herein means a value calculated from the endothermic peak area in a curve (DSC curve) obtained by differential scanning calorimetry (DSC).

The crystallization degree is measured in accordance with ASTM D3418-8 using a differential scanning calorimeter (DSC). Specifically, a measurement subject is placed on an aluminum pan and an empty pan is set as a control, after which the measurement is performed at a heating rate of 10° C./min. The melting point of indium and that of zinc are used for temperature correction of the detection unit of the measuring device, and the fusion heat of indium is used for colorimetric correction.

The weight-average molecular weight of the polyethylene is not particularly restricted; however, it is preferably from 5,000 to 160,000, more preferably from 10,000 to 160,000, still more preferably from 10,000 to 159,000.

The weight-average molecular weight can be measured by the above-described method.

(Ethylene-Propylene-Diene Rubber)

The specific TPV contains at least one ethylene-propylene-diene rubber (EPDM). The term "EPDM" used herein refers to a rubber-like copolymer of ethylene, propylene and a diene compound, and encompasses EPDM modification products (e.g., maleic acid-modified EPDMs).

Examples of the diene compound contained in the EPDM include ethylidene norbornene (ENB), 1,4-hexadiene (1,4-HD), and dicyclopentadiene (DCP).

Examples of the EPDM modification products include maleic acid-modified EPDMs. A maleic acid-modified EPDM can be obtained by treating an EPDM with maleic anhydride.

From the standpoint of the injection properties, the number-average molecular weight of the EPDM is preferably from 100,000 to 300,000, more preferably from 120,000 to 160,000.

As the EPDM, a commercially available product may be used as well, and examples thereof include, but not particularly limited, "EPT X-3012P" manufactured by Mitsui Chemicals, Inc.

The weight-average molecular weight can be measured by gel permeation chromatography (GPC) using, for example, a GPC (gel permeation chromatography) apparatus such as "HLC-8321GPC/HT" manufactured by Tosoh Corporation.

As the EPDM contained in the specific TPV, the above-described EPDMs may be used singly, or in combination of two or more thereof. It is noted here, however, that the EPDM(s) contained in the specific TPV is/are preferably selected as appropriate from the standpoints of the hardness, the permanent compression set, and the injection properties.

—Dynamic Cross-Linking—

The EPDM contained in the specific TPV is dynamically cross-linked.

The dynamic cross-linking is performed by kneading a mixture of the EPDM and a prescribed cross-linking agent using a kneader, a BANBURY mixer or the like until a uniformly mixed state is obtained. In the dynamic cross-linking, an appropriate amount of a filler, such as carbon, oil or calcium carbonate, may be added to the EPDM-containing mixture.

The kneading machine used for the kneading is not particularly restricted and, for example, a screw extruder, a kneader, a BANBURY mixer, or a biaxial kneading extruder can be used. Thereamong, it is preferred to use a biaxial kneading extruder. Alternatively, plural kneading machines may be used to perform sequential kneading. The kneading conditions may be adjusted as appropriate. From the standpoint of dispersion, the shear rate during the kneading is preferably from 1.17 sec$^{-1}$ to 2.5 sec$^{-1}$. From the standpoint of the vulcanization degree of the resulting dispersed rubber, the overall kneading time is preferably from 30 seconds to about 10 minutes.

As the cross-linking agent (i.e., a vulcanizing agent) for the dynamic cross-linking, an ordinary rubber vulcanizing agent (i.e., a cross-linking agent) can be used.

Specifically, examples of a sulfur-based vulcanizing agent include powder sulfur, precipitated sulfur, highly dispersed sulfur, surface-treated sulfur, insoluble sulfur, dimorpholine disulfide and alkylphenol disulfide, and these vulcanizing agents may be used in an amount of, for example, 0.5 phr to about 4 phr ("phr" means "parts by mass" per 100 parts by mass of the rubber component).

Examples of an organic peroxide-based vulcanizing agent include benzoyl peroxide, t-butyl hydroperoxide, 2,4-bichlorobenzoyl peroxide, 2,5-dimethyl-2,5-di(t-butylperoxy) hexane and 2,5-dimethylhexane-2,5-di(peroxybenzoate), and these vulcanizing agents may be used in an amount of, for example, 1 phr to about 20 phr.

Further, examples of a phenol resin-based vulcanizing agent include mixed cross-linked type vulcanizing agents that contain a halogen donor (e.g., a brominated alkylphenol resin, tin chloride, or chloroprene) and an alkylphenol resin, and such vulcanizing agents may be used in an amount of, for example, 1 phr to about 20 phr.

Examples of other vulcanizing agents include zinc white (about 5 phr), stearic acid (about 2 phr), magnesium oxide (about 4 phr), litharge (from 10 phr to about 20 phr), p-quinone dioxime, p-dibenzoylquinone dioxime, tetrachloro-p-benzoquinone, poly-p-dinitrosobenzene (from 2 phr to about 10 phr), and methylene dianiline (from 0.2 phr to about 10 phr). As required, a vulcanization accelerator may also be added to the vulcanizing agent. As the vulcanization accelerator, an ordinary vulcanization accelerator, such as an aldehyde-ammonia-based, guanidine-based, thiazole-based, sulfenamide-based, thiuram-based, dithioate-based, or thiourea-based vulcanization accelerator, can be used in an amount of, for example, 0.5 phr to about 2 phr.

(Other Additives)

In the specific TPV, as desired, a variety of additives, examples of which include various fillers (e.g., silica, calcium carbonate, clay, and carbon black), compatibilizing agents (e.g., maleic acid-modified polyolefins, polymers obtained by graft-polymerizing acrylic acid or glycidyl methacrylate to a polyolefin, block copolymers of a polyolefin and a polyamide, and maleic acid-modification products of styrene-ethylene-butadiene-styrene copolymers), age resistors (e.g., those age resistors described in WO2005/063482), oils, plasticizers, colorants, weather resistant agents, and reinforcing agents, may also be incorporated. The content of these additives in the thermoplastic rubber vulcanizate is not particularly restricted, and the additives can be used as appropriate within a range that does not impair the effects of the invention.

—Physical Properties of Specific TPV—

The melting point (or softening point) of the specific TPV itself is usually from 100° C. to 350° C., preferably from 100° C. to about 250° C. and, from the standpoint of tire productivity, it is preferably from 120° C. to about 250° C., more preferably from 120° C. to 200° C.

The use of the specific TPV having a melting point of from 120° C. to 250° C. makes it easy to perform injection molding and, when the exterior member is formed by injection molding, the exterior member can be easily welded to the tire frame. Therefore, the tire according to one embodiment of the invention has high adhesion between the tire frame and the exterior member and exhibits excellent durability. In cases where an exterior member is formed by injection molding, the temperature of heating the specific TPV is higher than its melting point (or softening point) by preferably 10° C. to 150° C., more preferably by 10° C. to 100° C.

The tensile elastic modulus, which is defined in JIS K7113:1995, of the specific TPV itself is preferably from 0.1 MPa to 100 MPa, more preferably from 0.1 MPa to 50 MPa, still more preferably from 0.1 MPa to 5.0 MPa. When the tensile elastic modulus is in this range, the specific TPV is neither too soft nor too hard as the exterior member (e.g., tread).

The hardness, which is defined in JIS K6253-3:2012 (Type A Durometer), of the specific TPV itself is not particularly restricted; however, from the standpoint of the durability of the exterior member, it is preferably not less than 60, more preferably from 60 to 95. Particularly, when the hardness is 95 or less, the exterior member has superior durability against bending and thus can be suitably used as a side member.

(Formation of Exterior Member)

It is preferred that the exterior member is formed by injection molding. For example, in the formation of a tread member, a belt-form tread member that has a tread pattern constituted by plural grooves on the surface coming into contact with the road surface can be formed by injection molding. In this case, the resulting tread member can be welded to the surface of the crown portion of the tire frame by winding the tread member for one lap on the tire frame, and subsequently heating the resultant using a hot runner or the like with the temperature on the tread member side being set higher than the temperature on the tire frame side. As a result, a tire in which the tread member is welded to the surface of the crown portion of the tire frame can be formed.

Alternatively, after the formation of the tire frame, a tire in which a tread member is welded to the surface of the crown portion of the tire frame may be formed by setting the tire frame in a mold, injecting the specific TPV forming the tread member into the mold, and subsequently cooling the resultant. It is noted here, however, that the method of producing the tire of the invention is not restricted to these methods, and any combination of known methods can be utilized as appropriate.

Further, depending on the materials and the intended purpose, the exterior member may be subjected to a vulcanization treatment before or after the exterior member is arranged on the tire frame.

<Reinforcing Cord Layer>

The tire according to one embodiment of the invention may also have a reinforcing cord layer which contains a reinforcing cord wound on the outer circumferential portion of the tire frame in the circumferential direction.

The reinforcing cord layer can be configured to contain a resin material. By incorporating a resin material into the reinforcing cord layer in this manner, since the difference in hardness between the tire and the reinforcing cord layer can be reduced as compared to a case where the reinforcing cord is fixed with a cushion rubber, a reinforcing cord member can be more tightly adhered to and more firmly fixed with the tire frame. In the present specification, when a simple expression of "resin" is used as in the above, the "resin" is a concept that encompasses thermoplastic resins and thermosetting resins, but not vulcanized rubbers. The concept of "thermoplastic resin" encompasses thermoplastic elastomers.

Further, when the reinforcing cord member is a steel cord and an attempt is made to separate the reinforcing cord member from the cushion rubber at the time of tire disposal, it is difficult to separate a vulcanized rubber from the reinforcing cord member only by heating; however, a resin material can be separated from the reinforcing cord material only by heating. Therefore, the use of a resin material is advantageous in terms of recyclability of the tire. In addition, a resin material usually has a lower loss coefficient (tan δ) than vulcanized rubbers. Accordingly, the rolling performance of the tire can be improved by incorporating a large amount of a resin material into the reinforcing cord layer. Moreover, a resin material having a relatively high elastic modulus as compared to vulcanized rubbers is advantageous in that such a resin material has higher in-plane shear rigidity and provides superior steering stability and wear resistance during tire running.

Examples of a thermosetting resin that can be used in the reinforcing cord layer include phenol resins, urea resins, melamine resins, epoxy resins, polyamide resins, and polyester resins.

Examples of a thermoplastic resin include urethane resins, olefin resins, vinyl chloride resins, polyamide resins, and polyester resins.

Examples of a thermoplastic elastomer include amide-based thermoplastic elastomers (TPA), polyester-based thermoplastic elastomers (TPC), polyolefin-based thermoplastic elastomers (TPO), polystyrene-based thermoplastic elastomers (TPS), polyurethane-based thermoplastic elastomers (TPU), cross-linked thermoplastic rubbers (TPV), and other thermoplastic elastomers (TPZ), all of which are defined in JIS K6418:2007. Taking into consideration the elasticity required during running as well as the moldability and the like in the production, it is preferred to use a thermoplastic elastomer.

In cases where the reinforcing cord layer is formed in such a manner that at least a part of the reinforcing cord member is embedded, it is preferred that the resin material contained in the reinforcing cord layer is mainly a resin material containing an olefin resin in the vicinity of the cord-embedded portion of the tire frame; however, the resin material may take a mode of further coating other resin as well. In this case, the resin material containing an olefin resin constituting the tire frame preferably contains an acid-modified olefin resin.

Moreover, in cases where the reinforcing cord layer is formed by a reinforcing cord coated with a resin material, it is preferred to select a resin material that is highly weldable to a resin material containing an olefin resin with heat or the like. As such a resin material that is highly (thermally) weldable with a resin material containing an olefin resin, for example, a polyolefin-based thermoplastic elastomer or an olefin resin can be used. Particularly, the resin material contained in the reinforcing cord layer preferably contains a resin material containing an olefin resin from the standpoint of the pull-out property properties of the reinforcing cord, and the resin material more preferably contains a polyethylene-based resin.

As the polyethylene-based resin contained in the resin material constituting the reinforcing cord layer, the same polyethylene-based resins as those exemplified above in the description of the thermoplastic rubber vulcanizate constituting the exterior member can be used.

The elastic modulus (tensile elastic modulus defined in JIS K7113:1995) of the resin material used in the reinforcing cord layer is preferably set in a range of from 0.1 times to 10 times of the elastic modulus of the resin material constituting the tire frame. When the elastic modulus of the resin material is 10 times or less of that of the thermoplastic resin material constituting the tire frame, the crown portion is not excessively hard, so that the tire can be easily fitted to a rim. Meanwhile, when the elastic modulus of the resin material is 0.1 times or greater of that of the resin material constituting the tire frame, the resin constituting the reinforcing cord layer is not excessively soft, so that excellent belt in-plane shear rigidity is attained, and the cornering ability is improved.

In cases where a resin material is incorporated into the reinforcing cord layer, from the standpoint of improving the pull-out properties of the reinforcing cord (i.e., the difficulty of the reinforcing cord to be pulled out), preferably not less than 20%, more preferably not less than 50% of the surface of the reinforcing cord member is covered with the resin material. The content of the resin material in the reinforcing cord layer is, from the standpoint of improving the pull-out properties of the reinforcing cord, preferably not less than 20% by mass, more preferably not less than 50% by mass, with respect to the total mass of the materials constituting the reinforcing cord layer excluding the reinforcing cord.

First Embodiment

A tire according to a first embodiment is described below referring to the drawings.

Figure 1A:
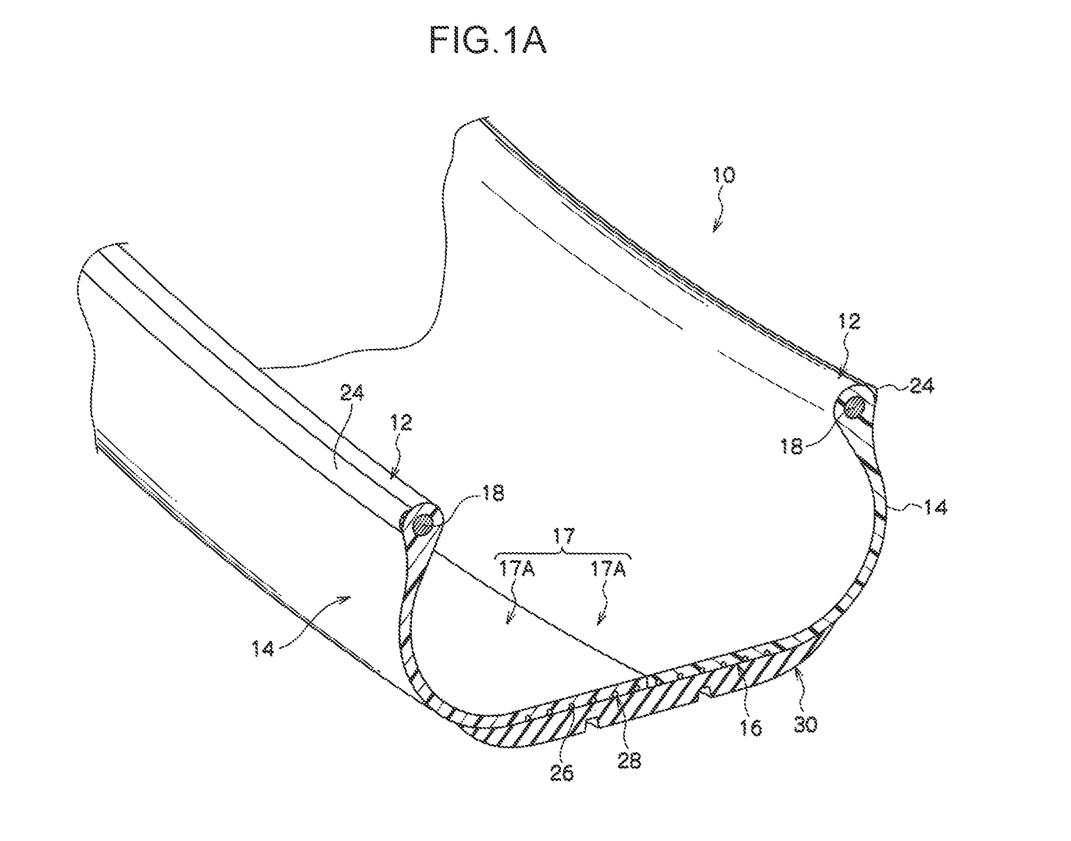
FIG. 1A is a perspective view illustrating a cross-section of a part of a tire according to one embodiment of the invention.
Figure 1B:
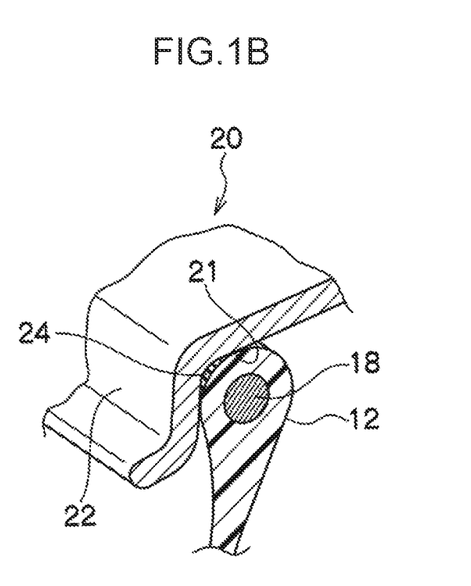
FIG. 1B is a cross-sectional view of a bead portion fitted to a rim.

A tire 10 of this embodiment is described. FIG. 1A is a perspective view illustrating a cross-section of a part of a tire according to one embodiment of the invention. FIG. 1B is a cross-section of a bead portion fitted to a rim. As illustrated in FIG. 1A, the tire 10 of this embodiment has a cross-sectional shape that is substantially the same as those of conventional ordinary rubber-made pneumatic tires.

As illustrated in FIG. 1A, the tire 10 includes a tire case 17 (i.e., tire frame), which includes: a pair of bead portions 12, which are each in contact with a bead sheet 21 and a rim flange 22 of a rim 20 as illustrated in FIG. 1B; side portions 14, which extend on the tire radial-direction outer side from the respective bead portions 12; and a crown portion 16 (i.e., outer circumferential portion), which connects the tire radial-direction outer end of one side portion 14 with the tire radial-direction outer end of the other side portion 14.

The tire case 17 of this embodiment is formed from a resin material containing an olefin resin.

In this embodiment, the tire case 17 is formed from a resin material containing an olefin resin; however, the invention is not restricted to this mode, and resin materials having different characteristics may be used for the respective parts of the tire case 17 (i.e., the side portions 14, the crown portion 16, the bead portions 12 and the like) as in the case of a conventional ordinary rubber-made pneumatic tire. Further, a reinforcing material (e.g., fibers made of a polymer material or a metal, cords, a non-woven fabric, or a woven fabric) may be embedded in the tire case 17 (e.g., the bead portions 12, the side portions 14, and the crown portion 16) so as to reinforce the tire case 17 with the reinforcing material.

The tire case 17 of this embodiment is obtained by joining together a pair of tire case half sections (i.e., tire frame pieces) 17A formed from a resin material containing an olefin resin. The tire case half sections 17A are each formed by integrally molding (e.g., injection molding) one bead portion 12, one side portion 14 and a half-width crown portion 16, and the resulting tire case half sections 17A having the same annular shape are aligned to face each other and joined at the tire equatorial plane to form the tire case 17. The tire case 17 is not restricted to be formed by joining two members, and may be formed by joining three or more members.

In the tire of this embodiment, the tire frame is formed from a single resin material; however, the tire frame may also be formed by using plural materials in combination for the crown portion, the side portions and the like of the tire frame.

The tire case half sections 17A formed from the resin material containing an olefin resin can be molded by, for example, vacuum molding, pressure molding, injection molding, or melt casting. Therefore, as compared to a conventional case of molding a tire case from a rubber, since vulcanization is not required, the production process can be greatly simplified and the molding time can be shortened.

In addition, in this embodiment, since the tire case half sections 17A have a bilaterally symmetrical shape, that is, one of the tire case half sections 17A has the same shape as the other tire case half section 17A, there is also an advantage that only one type of mold is required for molding the tire case half sections 17A.

In this embodiment, as illustrated in FIG. 1B, an annular bead core 18 composed of a steel cord, which is similar to those used in conventional ordinary pneumatic tires, is embedded in each bead portion 12. However, the invention is not restricted to this mode, and the bead core 18 may be omitted as long as the rigidity of the bead portions 12 is ensured and there is no problem in fitting the bead portions 12 with the rim 20. The bead core 18 may also be formed from, for example, an organic fiber cord, a resin-coated organic fiber cord or a hard resin, other than the steel cord.

In this embodiment, an annular sealing layer 24 (chafer) formed from the specific TPV is arranged on a part of each bead portion 12 that comes into contact with the rim 20, or at least on a part of each bead portion 12 that comes into contact with the rim flange 22 of the rim 20. This sealing layer 24 may also be formed on those parts where the tire case 17 (bead portions 12) comes into contact with the bead sheet 21. The use of the specific TPV as the sealing layer 24 enables to form the sealing layer by injection molding, and the tire productivity is thus further improved. In addition, the use of the specific TPV as the sealing layer 24 enables to effectively inhibit leakage of air from the tire, and the tire durability is thus further improved.

As illustrated in FIG. 1A, in the crown portion 16, a reinforcing cord 26 having higher rigidity than the resin material containing an olefin resin constituting the tire case 17 is wound in the circumferential direction of the tire case 17. In a cross-sectional view taken along the axial direction of the tire case 17, the reinforcing cord 26 is spirally wound with at least a part thereof being embedded in the crown portion 16, and forms a reinforcing cord layer 28. On the tire radial-direction outer circumferential side of the reinforcing cord layer 28, a tread 30 formed from the specific TPV is arranged.

Figure 2:
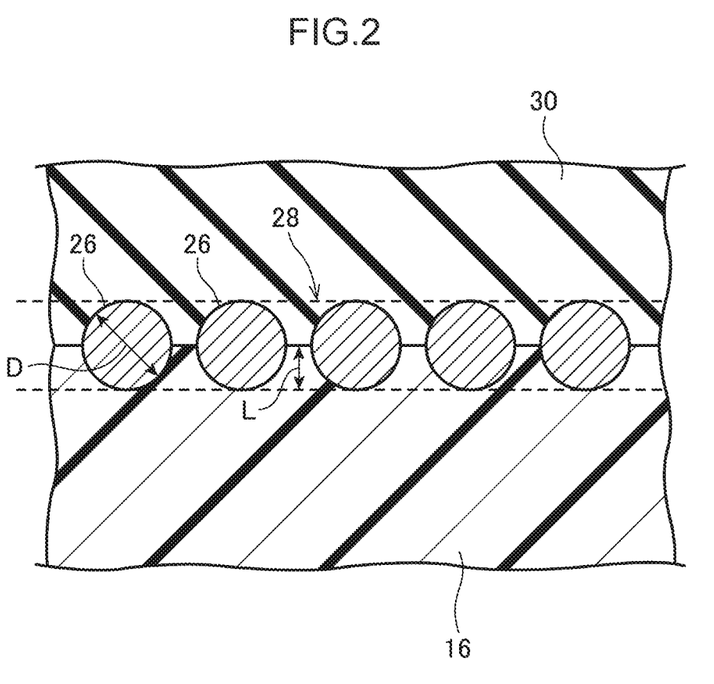
FIG. 2 is a cross-sectional view taken along the tire rotation axis, which illustrates a state where a reinforcing cord is embedded in a crown portion of a tire case of a tire according to a first embodiment.

The reinforcing cord layer 28 formed by the reinforcing cord 26 is described below referring to FIG. 2. FIG. 2 is a cross-sectional view taken along the tire rotation axis, which illustrates a state where the reinforcing cord is embedded in the crown portion of the tire case of the tire according to the first embodiment. As illustrated in FIG. 2, in a cross-sectional view taken along the axial direction of the tire case 17, the reinforcing cord 26 is spirally wound with at least a part thereof being embedded in the crown portion 16, and forms the reinforcing cord layer 28, which is indicated by the part between the dashed lines in FIG. 2, together with a part of the outer circumferential portion of the tire case 17. The part of the reinforcing cord 26 that is embedded in the crown portion 16 is in close contact with the resin material containing an olefin resin constituting the crown portion 16 (tire case 17). As the reinforcing cord 26, for example, a monofilament (single strand) of metal fibers, organic fibers or the like, or a multifilament (twisted strand) in which such fibers are twisted together (e.g., a steel cord composed of twisted steel fibers), can be used. In this embodiment, a steel cord is used as the reinforcing cord 26.

In FIG. 2, the embedding depth L indicates the amount of the reinforcing cord 26 embedded in the tire case 17 (crown portion 16) along the tire rotation axis direction. The embedding depth L of the reinforcing cord 26 in the crown portion 16 is preferably not less than 1/5, more preferably greater than 1/2, of the diameter D of the reinforcing cord 26. It is most preferred that the entirety of the reinforcing cord 26 is embedded in the crown portion 16. When the embedding depth L of the reinforcing cord 26 is greater than 1/2 of the diameter D of the reinforcing cord 26, the reinforcing cord 26 is unlikely to come out of the embedded portion because of the dimensions of the reinforcing cord 26. Further, when the entirety of the reinforcing cord 26 is embedded into the crown portion 16, since the surface (outer circumferential surface) is made flat, entry of air to the periphery of the reinforcing cord 26 can be inhibited even if a member is arranged on the crown portion 16 where the reinforcing cord 26 is embedded. The reinforcing cord layer 28 corresponds to a belt that is arranged on the outer circumferential surface of a carcass of a conventional rubber-made pneumatic tire.

On the tire radial-direction outer circumferential side of the reinforcing cord layer 28, the tread 30 is arranged. As the tread 30, the specific TPV is used. As illustrated in FIG. 2, in this embodiment, the tread 30 is in direct contact with the crown portion 16 of the tire case 17. The tread 30 and the crown portion 16 are welded together at their interface. The tread 30 preferably has superior wear resistance than the resin material containing the olefin resin constituting the tire case 17. Further, on the surface of the tread 30 that comes into contact with the road surface, a tread pattern constituted by plural grooves is formed in the same manner as in conventional rubber-made pneumatic tires.

A method of producing the tire according to one embodiment of the invention is described below.

(Tire Case Molding Step)

First, tire case half sections each supported on a thin metal support ring are aligned to face each other. Subsequently, a joining mold (not illustrated) is placed such that it comes into contact with the outer circumferential surfaces of the abutting parts of the tire case half sections. It is noted here that the joining mold is configured in such a manner to press the peripheries of the joining parts (i.e., abutting parts) of the tire case half sections 17A with a prescribed pressure. Then, the peripheries of the joining parts of the tire case half sections are pressed at a temperature of not lower than the melting point of the resin material constituting the resulting tire case. When the joining parts of the tire case half sections are heated and pressurized by the joining mold, the joining parts are melted and the tire case half sections are welded together, as a result of which these members are integrated to form the tire case 17. In this embodiment, the joining parts of the tire case half sections are heated using the joining mold; however, the invention is not restricted to this mode, and the tire case half sections may be joined together by, for example, heating the joining parts using a separately arranged high-frequency heater or the like, or softening or melting the joining parts in advance by irradiation with hot air, infrared radiation or the like, and subsequently applying a pressure to the joining parts using a joining mold.

(Reinforcing Cord Member Winding Step)

Next, although not illustrated in figures, using a cord feeding apparatus equipped with a reel on which the reinforcing cord 26 is wound, a cord heater, various rollers and the like, the reinforcing cord layer 28 can be formed on the outer circumferential side of the crown portion 16 of the tire case 17 by winding the heated reinforcing cord 26 on the outer circumferential surface of the crown portion 16 while embedding the reinforcing cord 26.

(Exterior Member Arrangement Step)

Then, the tread 30 is arranged on the outer circumferential surface of the tire case 17. The method of forming the tread 30 and the method of attaching the tread 30 to the tire case 17 are not particularly restricted and, for example, the tread 30, which is in a belt form and has a tread pattern constituted by plural grooves on the surface coming into contact with the road surface, is formed in advance by injection molding and this tread 30 is subsequently wound for one lap on the tire case 17, after which the tread 30 is heated using a hot runner or the like, whereby the tread 30 can be welded to the outer circumferential surface of the tire case 17. After the injection molding of the tread 30, the tread 30 may be vulcanized as well.

Thereafter, the tire 10 is completed by bonding the sealing layer 24 composed of a vulcanized rubber to each bead portion 12 of the tire case 17 using an adhesive or the like.

(Effects)

In the tire 10 of this embodiment, since the tire case 17 is formed from the resin material containing the olefin resin and the tread 30 is formed from the specific TPV, the hardness is high and the permanent compression set is small. In addition, even without using an adhesive, good adhesion between the tire case 17 and the tread 30 (exterior member) is attained. Moreover, the tire 10 has a simpler structure and is thus lighter in weight than conventional tires made of rubber. Accordingly, the tire 10 of this embodiment has high wear resistance and high durability. Furthermore, since the tread 30 can be injection-molded and can be directly welded to the tire case 17, the step of applying an adhesive at the time of attaching the tread 30 to the tire case 17 can be omitted. Therefore, the tire 10 of this embodiment has exceptionally good productivity as well.

In the tire 10 of this embodiment, since the reinforcing cord 26 having higher rigidity than the resin material containing the olefin resin is spirally wound in the circumferential direction on the outer circumferential surface of the crown portion 16 of the tire case 17 formed from the resin material containing the olefin resin, the puncture resistance, the cut resistance and the circumferential rigidity of the tire 10 are improved. By the improvement in the circumferential rigidity of the tire 10, creeping of the tire case 17 formed from the resin material containing the olefin resin is inhibited.

In a cross-sectional view taken along the axial direction of the tire case 17 (the cross-sectional view illustrated in FIG. 1A), the reinforcing cord 26 is at least partially embedded the outer circumferential surface of the crown portion 16 of the tire case 17 formed from the resin material containing the olefin resin and is in close contact with the resin material containing the olefin resin; therefore, entry of air during the production is inhibited, and the movement of the reinforcing cord 26 caused by an input or the like during running is suppressed. As a result, delamination and the like of the reinforcing cord 26, the tire case 17 and the tread 30 are inhibited, so that the durability of the tire 10 is improved.

In addition, as illustrated in FIG. 2, since the embedding depth L of the reinforcing cord 26 is not less than ⅕ of the diameter D, entry of air during the production is effectively inhibited, so that the movement of the reinforcing cord 26 caused by an input or the like during running is further suppressed.

Moreover, since the annular bead core 18 composed of a metal material is embedded in each of the bead portions 12, the tire case 17, namely the tire 10, is firmly retained on the rim 20 in the same manner as in conventional rubber-made pneumatic tires.

Further, since the sealing layer 24, which is composed of a rubber material showing superior sealing performance than the resin material containing the olefin resin constituting the tire case 17, is arranged on the parts of the bead portions 12 that come into contact with the rim 20, the sealing performance between the tire 10 and the rim 20 is improved. Accordingly, as compared to a case where sealing is made by the rim 20 and the resin material containing the olefin resin constituting the tire case, leakage of air from the tire is further inhibited. In addition, the rim fittability is also improved by arranging the sealing layer 24.

Furthermore, a configuration in which the reinforcing cord 26 is heated is adopted in the first embodiment; however, for example, a configuration in which the outer circumference of the reinforcing cord 26 is coated with the same resin material containing the olefin resin as that used for the tire case 17 may be adopted as well. In this case, by heating the coating resin material along with the reinforcing cord 26 at the time of winding the coated reinforcing cord on the crown portion 16 of the tire case 17, entry of air into the crown portion 16 during the embedding process can be effectively inhibited.

The tire 10 of the first embodiment is a so-called tube-less tire in which an air chamber is formed between the tire 10 and the rim 20 by fitting the bead portions 12 to the rim 20; however, the invention is not restricted to this configuration, and the tire of the invention may assume a complete tube shape.

From the production standpoint, it is easy to spirally wind the reinforcing cord 26; however, for example, a method of arranging the reinforcing cord 26 discontinuously along the width direction may be considered as well.

Second Embodiment

Next, a tire according to a second embodiment is described below referring to the drawings.

Figure 3:
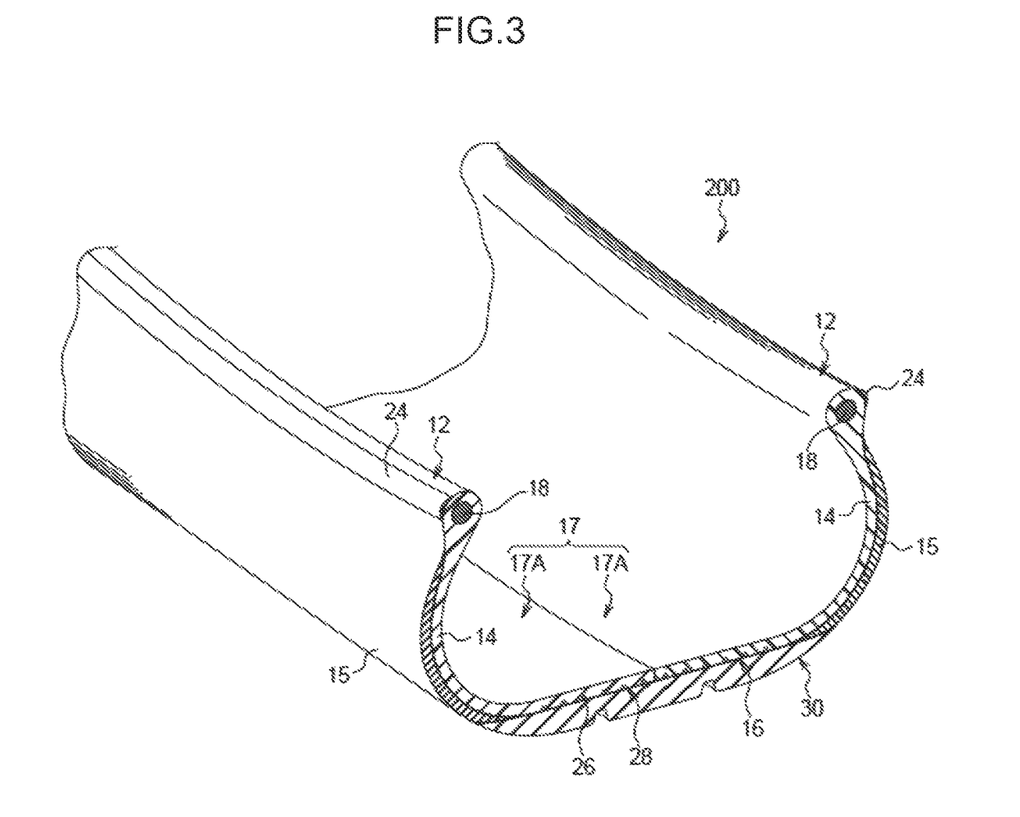
FIG. 3 is a perspective view illustrating a cross-section of a part of a tire according to a second embodiment.

A tire 200 of this embodiment is described. FIG. 3 is a perspective view illustrating a cross-section of a part of the tire according to the second embodiment. As illustrated in FIG. 3, in the tire 200 of this embodiment, as opposed to the tire 10 of the first embodiment, side members 15 are arranged as exterior members on the width-direction outer side of the respective side portions 14. It is noted here that those members illustrated in FIG. 3 that are common to FIG. 1 are assigned with the same symbols, and descriptions thereof are omitted here.

In the tire 200 of this embodiment, in addition to the tread 30 formed from the specific TPV, the side members 15 are attached as exterior members on the surfaces of the side portions 14. The side members 15 are formed using the same material as the tread 30, namely a material obtained by adding an additive(s) (e.g., carbon black) to the specific TPV. In the same manner as the tread 30, the side members 15 preferably have superior wear resistance than the resin constituting the tire case 17. The side members 15 are each in direct contact with the surface of the respective side portions 14, and the side members 15 are welded with the respective side portions 14 at their interfaces.

The side members 15 can be formed by injection molding or the like in the same manner as the tread 30. After the injection molding of the side members 15, the side members 15 may be vulcanized as well.

As illustrated in FIG. 3, in this embodiment, the ends of the side members 15 on the crown portion 16 side are adhered with the respective ends of the tread 30 in an overlapping manner. In this case, the ends of the side members 15 on the crown portion 16 side are preferably arranged such that they are positioned on the tire radial-direction inner side than the ends of the tread 30. Further, the tread 30 and the side members 15 may be welded together at the interfaces of the overlapping ends.

In this embodiment, in order to attach the side members 15 and the tread 30 to the tire case 17, first, the side members 15 are welded to the respective side portions 14 of the tire case 17. The method of attaching the side members 15 is not particularly restricted and, for example, the side members 15 formed by injection molding can each be welded to the outer surface of the respective side portions 14 by heating the side members 15 using a hot runner or the like. Then, the belt-form tread 30 is wound on the tire case 17 such that the ends thereof overlap with the ends of the side members 15, and the tread 30 is subsequently heated using a hot runner or the like, whereby the tread 30 can be welded to the outer circumferential surface of the tire case 17.

In this embodiment, a mode in which the side members 15 are arranged on the surfaces of both side portions 14 of the tire case 17 is described; however, the tire of the invention is not restricted to this embodiment, and the tire of the invention may take a mode in which a side member 15 is arranged only on one tire width-direction surface of the tire 200.

Thus far, modes for carrying out the invention have been described referring to embodiments; however, these embodiments are merely examples, and the invention can be carried out with various modifications within a range that does not depart from the spirit of the invention. It is needless to say that the scope of the rights of the invention is not limited to these embodiments.

Further, a tire in which a chafer member and a tread member are formed from the specific TPV is described in the first embodiment, and a tire in which a tread member and side members are formed from the specific TPV is described in the second embodiment; however, the tire of the invention in the first embodiment may take a form in which only one of the chafer member and the tread member is formed from the specific TPV, while the tire of the invention in the second embodiment may take a form in which only the tread member or the side members is/are formed from the specific TPV.

The tire of the disclosure encompasses tires of the modes according to the following [1] to [4]

[1] A tire including: a circular tire frame formed from a resin material containing an olefin resin; and an exterior member formed from a thermoplastic rubber vulcanizate which contains an ethylene-propylene-diene rubber and a polyethylene-based resin and in which the content of the ethylene-propylene-diene rubber is from 20% by mass to 45% by mass with respect to the total mass of the thermoplastic rubber vulcanizate and the fluidity of the thermoplastic rubber vulcanizate is from 1.0 g/10 min to 60 g/10 min.

[2] The tire according to [1], wherein the olefin resin contained in the resin material is a polyethylene-based resin.

[3] The tire according to [1] or [2], wherein the polyethylene-based resin contained in the thermoplastic rubber vulcanizate is a linear low-density polyethylene.

[4] The tire according to [1] or [2], wherein the polyethylene-based resin contained in the thermoplastic rubber vulcanizate is an olefin block copolymer.

EXAMPLES

Examples 1 to 8 and Comparative Examples 1 to 10

The invention is described below more concretely by way of examples thereof. However, the invention is not restricted thereto by any means.

First, tires of Examples and Comparative Examples having the structure of the above-described first embodiment were each molded. In this process, UMERIT 1540F manufactured by Ube-Maruzen Polyethylene Co., Ltd. was used as the material constituting the tire case, and the materials shown in Table 1 below were used as the materials constituting each exterior member. It is noted here that, in Table 1 below, the numerical value of each material indicates the content (unit: % by mass) of the material.

The exterior members of the tires of Examples and Comparative Examples were each evaluated as described below.

<<Evaluation>>
<Preparation of Evaluation Samples>

In accordance with each material constitution shown in Table 1 below, a resin component and a rubber component were mixed and then kneaded using LABOPLASTOMILL 50MR (biaxial extruder manufactured by Toyo Seiki Seisaku-sho, Ltd.) to obtain a pellet of a thermoplastic rubber vulcanizate as an evaluation sample. As the EPDM, one which had been dynamically cross-linked using alkyl phenol as a cross-linking agent along with zinc white and stearic acid under the conditions of: temperature=160° C., shear rate=1.17 sec$^{-1}$ (=70 rpm), and kneading time=5 minutes. In those cases where a single resin component or rubber component was used, an evaluation sample was directly prepared therefrom without performing the above-described kneading.

<Hardness>

The thus obtained evaluations samples were molded into test pieces having a diameter of 13 mm and a thickness of 6 mm and, using these test pieces, the hardness was measured in accordance with JIS K6253-3:2012 (Type A Durometer) for Examples and Comparative Examples. The results thereof are shown in Table 1 below. It is noted here that a hardness of 60 or higher is regarded as an acceptable range.

<Permanent Compression Set>

The evaluation samples obtained above were molded into test pieces having a diameter of 13 mm and a thickness of 6 mm. These test pieces were each compressed for 22 hours at a compression ratio of 25% and a temperature of 70° C. and the permanent compression set was measured in accordance with JIS K6262:2006. The results of Examples are shown in Table 1 below. It is noted here that a smaller numerical value indicates a superior permanent compression set property, and a value of 75% or less is regarded as an acceptable range.

<Evaluation of Fluidity [MFR (g/10 min)] and Evaluation of Injection Property>

For the evaluation samples obtained above, the fluidity (MFR) was measured in accordance with ASTM A1238 (Method B) under a load of 98.07 N at a temperature of 230° C. using SEMI-MELT INDEXER Type 2A manufactured by Toyo Seiki Seisaku-sho, Ltd.

Further, using an injection molding machine α-15C manufactured by Fanuc Corporation, the evaluation samples were each injection-molded at a molding temperature of 230° C. and a mold temperature of 65° C. An evaluation of "A" was given to an evaluation sample that was sufficiently injection-molded; an evaluation of "B" was given to an evaluation sample that was injection-molded; and an evaluation of "C" was given to an evaluation sample that could not be injection-molded, or an evaluation sample that was injection-molded but, due to an excessively high fluidity, dripped from the nozzle or generated a burr on the resulting injection-molded article. The evaluation results are shown in Table 1.

<Wear Resistance>

Using a Lambourn tester manufactured by Iwamoto Seisakusho Co., Ltd., an abrasion test was performed under the conditions of: slip ratio=20%, test period=60 seconds, test force=50 N, and sand dropping rate=15 g/min. As the test pieces for the abrasion test, the evaluation samples obtained above that were each molded into a shape of 5 mm in thickness, about 50 mm in diameter and 20 mm in hollow diameter were used. As the test results, the amount of loss was determined from the change in weight of each test before and after the test, and the wear resistance was evaluated for Examples and Comparative Examples in accordance with the following evaluation criteria, taking the amount of loss determined for Comparative Example 8 (EPDM=100%) as a reference value.

An evaluation of "A" was given to a test sample whose amount of loss was the same as or less than that of Comparative Example 8.

An evaluation of "B" was given to a test sample whose amount of loss was greater than that of Comparative Example 8 and change in weight was 5% or less, taking the change in weight of Comparative Example 8 as a reference value.

An evaluation of "C" was given to a test sample whose amount of loss was greater than that of Comparative Example 8 and change in weight was greater than 5%, taking the change in weight of Comparative Example 8 as a reference value.

The wear resistance was evaluated as more excellent in the order of A>B>C.

TABLE 1

| | | Example 1 | Example 2 | Comparative Example 1 | Comparative Example 2 | Comparative Example 3 | Example 3 | Example 4 | Comparative Example 4 | Example 5 | Example 6 |
|---|---|---|---|---|---|---|---|---|---|---|---|
| Material constitution of exterior member | EPDM | 20 | 30 | 60 | 70 | 80 | 30 | 40 | 10 | 15 | 20 |
| | OBC | | | | | | 70 | 60 | | | |
| | LLDPE1 | 80 | 70 | 40 | 30 | 20 | | | | | |
| | LLDPE2 | | | | | | | | 90 | 85 | 80 |
| | TPV | | | | | | | | | | |
| | PEBA | | | | | | | | | | |
| Evaluation results | Hardness | 98 | 93 | 86 | 81 | 77 | 71 | 68 | 95 | 93 | 92 |
| | Permanent compression set (%) | 72 | 66 | 45 | 50 | 34 | 55 | 49 | 85 | 80 | 78 |
| | Fluidity (g/10 min) | 8.5 | 1.5 | no flow | no flow | no flow | 8.2 | 1.3 | 62.0 | 55.0 | 23.0 |
| | Injection moldability | A | B | C | C | C | A | B | C | B | A |
| | Wear resistance | B | B | A | A | A | B | B | A | A | A |

| | | Example 7 | Example 8 | Comparative Example 5 | Comparative Example 6 | Comparative Example 7 | Comparative Example 8 | Comparative Example 9 | Comparative Example 10 |
|---|---|---|---|---|---|---|---|---|---|
| Material constitution of exterior member | EPDM | 30 | 40 | 50 | | | 100 | | |
| | OBC | | | | | | | | |
| | LLDPE1 | | | | | | | 100 | |
| | LLDPE2 | 70 | 60 | 50 | | | | | 100 |
| | TPV | | | | 100 | | | | |
| | PEBA | | | | | 100 | | | |
| Evaluation results | Hardness | 91 | 88 | 86 | 58 | 79 | 58 | 97 | 97 |
| | Permanent compression set (%) | 72 | 71 | 54 | 53 | 92 | 29 | 84 | 90 |
| | Fluidity (g/10 min) | 10.0 | 2.9 | no flow | 14.4 | 10.0 | no flow | >10 | >60 |
| | Injection moldability | A | A | C | A | A | C | A | C |
| | Wear resistance | A | A | A | C | B | A | B | A |

The abbreviations used in Table 1 mean as follows.
EPDM: MITSUI EPT X3012P manufactured by Mitsui Chemicals, Inc., a rubber component
OBC: INFUSE 9817 manufactured by The Dow Chemical Company, a resin component
LLDPE1: UMERIT 1540F manufactured by Ube-Maruzen Polyethylene Co., Ltd., crystallization degree = 110.5 J/g, a resin component
LLDPE2: UMERIT 613A manufactured by Ube-Maruzen Polyethylene Co., Ltd., crystallization degree = 103.1 J/g, a resin component
TPV: MILASTOMER 6030BS, manufactured by Mitsui Chemicals, Inc., a thermoplastic rubber vulcanizate of polypropylene and ethylene-propylene-diene rubber
PEBA: PEBAX 2533SA manufactured by Arkema K.K., a resin component As seen from Table 1, in Examples where the exterior member was formed from a thermoplastic rubber vulcanizate which contained an ethylene-propylene-diene rubber and a polyethylene-based resin and in which the content of the ethylene-propylene-diene rubber was from 20% by mass to 45% by mass with respect to the total mass of the thermoplastic rubber vulcanizate and the fluidity was from 1.0 g/10 min to 60 g/10 min, the hardness, the permanent compression set, the wear resistance and the injection property were all favorable.

Furthermore, those tires that include such an exterior member whose hardness, permanent compression set and injection property are all favorable are expected to have a higher productivity and exhibit superior durability as compared to the tires of Comparative Examples The disclosures of Japanese Patent Application No. 2015-197638 filed on Oct. 5, 2015, is hereby incorporated by reference in its entirety.

All the documents, patent applications and technical standards that are described in the present specification are hereby incorporated by reference to the same extent as if each individual document, patent application or technical standard is concretely and individually described to be incorporated by reference.

The invention claimed is:

1. A tire comprising:
 a circular tire frame formed from a resin material containing an olefin resin; and
 an exterior member formed from a thermoplastic rubber vulcanizate which contains an ethylene-propylene-diene rubber and a polyethylene-based resin, and in which a content of the ethylene-propylene-diene rubber is from 20% by mass to 45% by mass with respect to a total mass of the thermoplastic rubber vulcanizate, and a fluidity of the thermoplastic rubber vulcanizate is from 1.0 g/10 min to 60 g/10 min.

2. The tire according to claim 1, wherein the olefin resin contained in the resin material is a polyethylene-based resin.

3. The tire according to claim 2, wherein the polyethylene-based resin contained in the thermoplastic rubber vulcanizate is a linear low-density polyethylene.

4. The tire according to claim 2, wherein the polyethylene-based resin contained in the thermoplastic rubber vulcanizate is an olefin block copolymer.

5. The tire according to claim 1, wherein the polyethylene-based resin contained in the thermoplastic rubber vulcanizate is a linear low-density polyethylene.

6. The tire according to claim 1, wherein the polyethylene-based resin contained in the thermoplastic rubber vulcanizate is an olefin block copolymer.

\* \* \* \* \*